United States Patent
Boulet et al.

(10) Patent No.: US 9,061,769 B2
(45) Date of Patent: Jun. 23, 2015

(54) AIR INLET FOR AIRCRAFT PROPULSION UNIT HAVING A STRUCTURE RESISTANT TO EXCESS PRESSURE AND A PROCESS FOR REPAIRING AN AIR INLET OF AN AIRCRAFT PROPULSION UNIT

(75) Inventors: Nicolas Boulet, Toulouse (FR); Sébastien Affortit, Brax (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 848 days.

(21) Appl. No.: 13/306,351

(22) Filed: Nov. 29, 2011

(65) Prior Publication Data
US 2012/0145254 A1 Jun. 14, 2012

(30) Foreign Application Priority Data
Dec. 9, 2010 (FR) .................................... 10 60285

(51) Int. Cl.
*B64D 33/02* (2006.01)
*F02C 7/04* (2006.01)
*F02C 7/045* (2006.01)

(52) U.S. Cl.
CPC ........... *B64D 33/02* (2013.01); *Y10T 29/49229* (2015.01); *F02C 7/04* (2013.01); *B64D 2033/0206* (2013.01); *F02C 7/045* (2013.01); *B64D 2033/0286* (2013.01)

(58) Field of Classification Search
CPC .......... B64D 33/02; B64D 2033/0286; B64D 2033/0206; F02C 7/04; F02C 7/045
See application file for complete search history.

(56) References Cited

U.S. PATENT DOCUMENTS

| 4,104,002 | A | * | 8/1978 | Ehrich | 415/119 |
| 4,132,240 | A | * | 1/1979 | Frantz | 137/15.1 |
| 4,154,256 | A | * | 5/1979 | Miller | 137/15.1 |
| 5,498,127 | A | * | 3/1996 | Kraft et al. | 415/119 |
| 5,743,488 | A | * | 4/1998 | Rolston et al. | 244/53 B |
| 7,766,280 | B2 | * | 8/2010 | Cloft et al. | 244/208 |
| 2002/0139899 | A1 | * | 10/2002 | Porte | 244/134 B |
| 2002/0139900 | A1 | * | 10/2002 | Porte et al. | 244/134 C |
| 2006/0024154 | A1 | | 2/2006 | Costa et al. | |

(Continued)

FOREIGN PATENT DOCUMENTS

| EP | 1 621 752 A2 | 2/2006 |
| GB | 2 064 412 A | 6/1981 |
| GB | 2 296 306 A | 6/1996 |

OTHER PUBLICATIONS

French Preliminary Search Report issued Jun. 16, 2011 in patent application No. FR 1060285 with English Translation of Category of Cited Documents.

*Primary Examiner* — William H Rodriguez
(74) *Attorney, Agent, or Firm* — Oblon, McClelland, Maier & Neustadt, L.L.P.

(57) ABSTRACT

An air inlet for nacelle of an aircraft propulsion unit comprising an inner envelope provided with a plurality of orifices for passage of fluid passing through the envelope, and a lip connected to the upstream edge of the inner envelope, and having a portion devoid of orifices for passage of fluid with an axial span of between 20% and 90% of the span of the inner envelope, and a circumferential span a of between 60° and 150° about a longitudinal axis of the air inlet. A process for repairing an air inlet comprising cutting out a recess in an upstream edge of an inner envelope of the air inlet, then arranging and fixing an impermeable panel in the recess so as to create an air inlet of the type described above.

12 Claims, 4 Drawing Sheets

(56) References Cited

U.S. PATENT DOCUMENTS

| | | | |
|---|---|---|---|
| 2006/0169532 A1* | 8/2006 | Patrick | 181/210 |
| 2007/0267246 A1 | 11/2007 | Ali et al. | |
| 2008/0092362 A1 | 4/2008 | Costa et al. | |
| 2008/0296431 A1* | 12/2008 | Ivers | 244/1 N |
| 2013/0283821 A1* | 10/2013 | Gilson et al. | 60/805 |

* cited by examiner

AIR INLET FOR AIRCRAFT PROPULSION UNIT HAVING A STRUCTURE RESISTANT TO EXCESS PRESSURE AND A PROCESS FOR REPAIRING AN AIR INLET OF AN AIRCRAFT PROPULSION UNIT

TECHNICAL FIELD

The present invention pertains to the field of aircraft propulsion units, and more particularly concerns the air inlets of nacelles of aircraft turbojet engines.

STATE OF THE PRIOR ART

An aircraft is propelled by one or more propulsion units which are each attached to the aircraft via a pylon generally located underneath a wing or at the fuselage and which each comprise a turbojet engine housed in a nacelle.

A nacelle generally assumes the form of a structure comprising an air inlet upstream of the turbojet engine, a median section intended to surround a fan of the turbojet engine, and a downstream section integrating thrust reversing means and intended to surround a combustion chamber and one or more turbines of the turbojet engine.

The air inlet comprises firstly an annular lip forming the leading edge of the nacelle and intended to capture the air needed for feeding the fan, and one or more internal compressors of the turbojet engine, and secondly a downstream structure onto which the lip is added and which is intended to channel the air adequately towards the fan blades.

The downstream structure of the air inlet usually comprises two coaxial annular envelopes joined to each other upstream via the lip of the air inlet. The outer envelope of this downstream structure takes part in the cowling of the turbojet engine whilst its inner envelope outerly delimits a duct supplying air to this turbojet engine.

The air inlets of nacelles generally comprise sound insulating means intended to attenuate the noise caused by the flow of air captured by these air inlets and by the interaction between the fans of the turbojet engines and this air flow.

These sound insulating means are usually in the form of air passage orifices provided in the inner envelope of the air inlets and leading into the alveoli of a honeycomb sound-insulating structure housed in a space between the inner and outer envelopes of the air inlets, and configured to allow dissipation of acoustic energy in a manner that is well known.

In addition, the inner envelope of an air inlet usually comprises drainage orifices which may optionally merge with the above-mentioned air passage orifices, and intended to drain away any water which may run along the inner envelope. These drainage orifices are generally located around the <<six o'clock>> position of the inner envelope i.e. downwards when an aircraft equipped with this air inlet is on the ground. These drainage orifices communicate with drainage ducts which can be formed by slots provided in the walls of the alveoli of the above-mentioned sound-insulating honeycomb structure if the air inlet is fitted with such a structure.

As indicated in patent application GB 2296306 A, some flight situations such as take-off and climbing may in particular give rise to the formation of a region of overpressure in the vicinity of the lower part of the inner envelope equipping the air inlet of the nacelle of propulsion units.

Yet, the permeability of the inner envelope being inherently limited, this overpressure generally translates as a load applied to the region under consideration of the inner envelope during a short period in which equilibrium is set up between the pressures either side of this inner envelope, in particular at the time of a change in engine speed of the turbojet engine. This load may be of sufficiently high intensity to damage the region under consideration of the inner envelope. Initiated detaching has been observed for example in the region concerned by this phenomenon of overpressure.

The above-mentioned patent application proposes reducing overpressure by allowing circulation of air between the upstream and downstream of the inner envelope within the honeycomb sound-insulating structure.

However, this solution is not entirely satisfactory owing to the limited permeability of the inner envelope which remains subject to forces liable to damage this inner envelope.

DISCLOSURE OF THE INVENTION

It is a particular objective of the invention to provide a simple, economic and efficient solution to this problem, allowing the above-mentioned disadvantages to be avoided.

One particular subject of the invention is an air inlet for the nacelle of an aircraft propulsion unit, which has good sound-insulating and/or draining capability and is not subject to risks of damage due to phenomena of overpressure of the type described above.

For this purpose, the invention proposes an air inlet for the nacelle of an aircraft propulsion unit, which comprises a substantially annular outer cowling, a substantially annular inner envelope intended to delimit a duct feeding air to a turbojet engine and comprising a plurality of fluid passage orifices passing through the envelope, and a substantially annular lip joined to the respective upstream edges of the cowling and of said inner envelope so as to form a leading edge of the air inlet.

According to the invention, the inner envelope has a portion devoid of fluid passage orifices extending axially from an upstream edge of said inner envelope over a distance of between 20% and 90% of the mean axial span of said inner envelope, and having a circumferential span of between 60° and 150° around a longitudinal axis of the air inlet.

By mean axial span of the inner envelope is meant the axial span of the inner envelope measured as a mean around the entire longitudinal axis of the air inlet.

Evidently, the definition of the portion devoid of fluid passage orifices implies the presence of such orifices distributed around the remainder of the inner envelope.

The above-mentioned fluid passage orifices may be intended for the sound insulation of the propulsion unit equipped with this air inlet, in which case these orifices are configured to allow at least air circulation, as will become more apparent from the following.

Part or all of these orifices may also be intended for draining water which may run along the inner envelope of the air inlet, in which case these orifices also allow circulation of water.

In addition it is possible, without departing from the scope of the present invention, that some fluid passage orifices of the inner envelope take part in the draining of water but do not take part in sound insulation, when this is of advantage.

In general, the portion devoid of fluid passage orifices of the inner envelope does not allow the passing of air and is therefore not subject to a mechanical load, in the event of overpressure applied to the inner envelope, as may be case for the inner envelope of air inlets of known type in which said overpressure induces a pressure imbalance either side of the inner envelope.

The invention finds its main advantage when the portion of the inner envelope that is devoid of fluid passage orifices is located in a region of this envelope which is exposed to phenomena of overpressure of the type described above.

For this purpose, the portion of the inner envelope that is devoid of fluid passage orifices is advantageously located in a lower region of this inner envelope through which a meridian plane passes which follows the longitudinal axis of the air inlet and is parallel to the vertical direction when the air inlet equips a propulsion unit of an aircraft stationed on the ground.

The portion of the inner envelope devoid of fluid passage orifices is therefore substantially able to coincide with the region of the inner envelope that is the most exposed to phenomena of overpressure of the above-described type which occur during some flight phases, in particular when the aircraft is climbing.

The portion of the inner envelope that is devoid of fluid passage orifices is preferably symmetrical relative to the afore-mentioned meridian plane.

In addition, the axial span of the above-mentioned portion devoid of fluid passage orifices is preferably between 40% and 80% of the mean axial span of the inner envelope.

Preferably, this portion devoid of fluid passage orifices has a circumferential span of between 90° and 120° around the longitudinal axis of the air inlet.

The axial span and the circumferential span of the portion of the inner envelope that is devoid of fluid passage orifices are therefore chosen so that they best correspond to the region of the inner envelope exposed to overpressure phenomena.

The plurality of fluid passage orifices advantageously comprises air passage orifices communicating with a honeycomb sound-insulating structure housed between the inner envelope and the outer cowling of the air inlet.

These air passage orifices allow dissipation of acoustic energy within the alveoli of the honeycomb structure, in a manner known per se.

The air passage orifices are preferably distributed homogeneously all around the longitudinal axis of the air inlet.

In this case, the above-mentioned honeycomb structure advantageously also extends all around this axis.

One part of the sound-insulating honeycomb structure advantageously extends facing the portion of the inner envelope that is devoid of fluid passage orifices. This part of the honeycomb structure is then covered by the above-mentioned portion of the inner envelope.

The sound-insulating honeycomb structure may therefore have geometry similar to that of sound-insulating honeycomb structures used in air inlets of known type.

The air inlet preferably comprises drainage means allowing circulation of water from upstream to downstream inside a space defined between the outer cowling and the inner envelope of the air inlet, these drainage means comprising drainage orifices forming part of the plurality of fluid passage orifices.

As explained above, some or all of the above-mentioned drainage orifices may also take part in sound insulation, optionally in cooperation with the above-mentioned honeycomb structure.

For this purpose, the drainage means preferably comprise the sound-insulating honeycomb structure.

This structure then comprises slots for example, formed in a radially inner region of the walls which together delimit the alveoli of this structure to allow the downstream circulation of the water collected in the alveoli via the above-mentioned drainage orifices.

In a first embodiment of the invention, the portion of the inner envelope that is devoid of fluid passage orifices is in the form of an impermeable panel i.e. devoid of fluid passage orifices, which is formed independently of the lip and is set in a recess of an upstream edge of at least one panel provided with fluid passage orifices and forming part of the inner envelope.

In this case, the lip of the air inlet may be of conventional type.

The above-mentioned impermeable panel is advantageously formed of the lay-up of several folds of a composite material, this material being formed of carbon fibres for example, or similar, embedded in a hardened resin.

In a second embodiment, the portion of the inner envelope that is devoid of fluid passage orifices is formed in a single piece with the lip of the air inlet and projects towards downstream from a radially inner downstream edge of this lip, so that it fits into a recess of an upstream edge of at least one panel provided with fluid passage orifices and forming part of the inner envelope.

It is to be noted that the inner envelope may be formed of a single panel or of a plurality of adjacent panels. In the latter case, some of these panels may optionally be devoid of fluid passage orifices when this is of advantage.

The invention also concerns a nacelle for an aircraft propulsion unit comprising an air inlet of the above-described type.

The invention further concerns an aircraft comprising at least one nacelle of the afore-mentioned type.

The invention also concerns a process for repairing a nacelle air inlet of an aircraft propulsion unit comprising an outer cowling that is substantially annular, a substantially annular inner envelope intended to delimit an annular air duct of a turbojet engine of this propulsion unit and comprising a plurality of fluid passage orifices passing through said inner envelope, and a substantially annular lip connected to the respective upstream edges of the cowling and of said inner envelope so as to form a leading edge of the air inlet.

According to the invention, the repair process comprises a step to cut out a recess in an upstream edge of the above-mentioned inner envelope, and a subsequent step to arrange an impermeable panel in the recess and to fix this impermeable panel onto the edge of the recess so as to form an air inlet according to the first embodiment described above.

The process of the invention therefore allows the repair of the inner envelope of an air inlet when this inner envelope has been damaged, in particular due to overpressure phenomena of the type described above, whilst protecting the repaired part of the inner envelope against the consequences of any future exposure to these overpressure phenomena.

The above-mentioned subsequent step of the repair process preferably comprises the lay-up, within the recess, of several folds of a composite material of which at least one first fold is fully housed in the recess whilst at least one second fold, superimposed over the first fold, partly overlaps the upstream edge of the recess so as to ensure the fixing of the impermeable panel to the remainder of the inner envelope.

The above-mentioned second fold also allows the ensured continuity of the radially inner surface of the inner envelope at the junction between the impermeable panel and the remainder of the inner envelope.

As a variant, all the folds can also be housed within the recess without any fold overlapping the upstream edge of the recess, when this is of advantage.

BRIEF DESCRIPTION OF THE DRAWINGS

The invention will be better understood and other details, advantages and characteristics thereof will become apparent on reading the following description given as a non-limiting example and with reference to the appended drawings in which.

In all these figures, identical references may designate identical or similar parts.

DETAILED DESCRIPTION OF PREFERRED EMBODIMENTS

Figure 1:
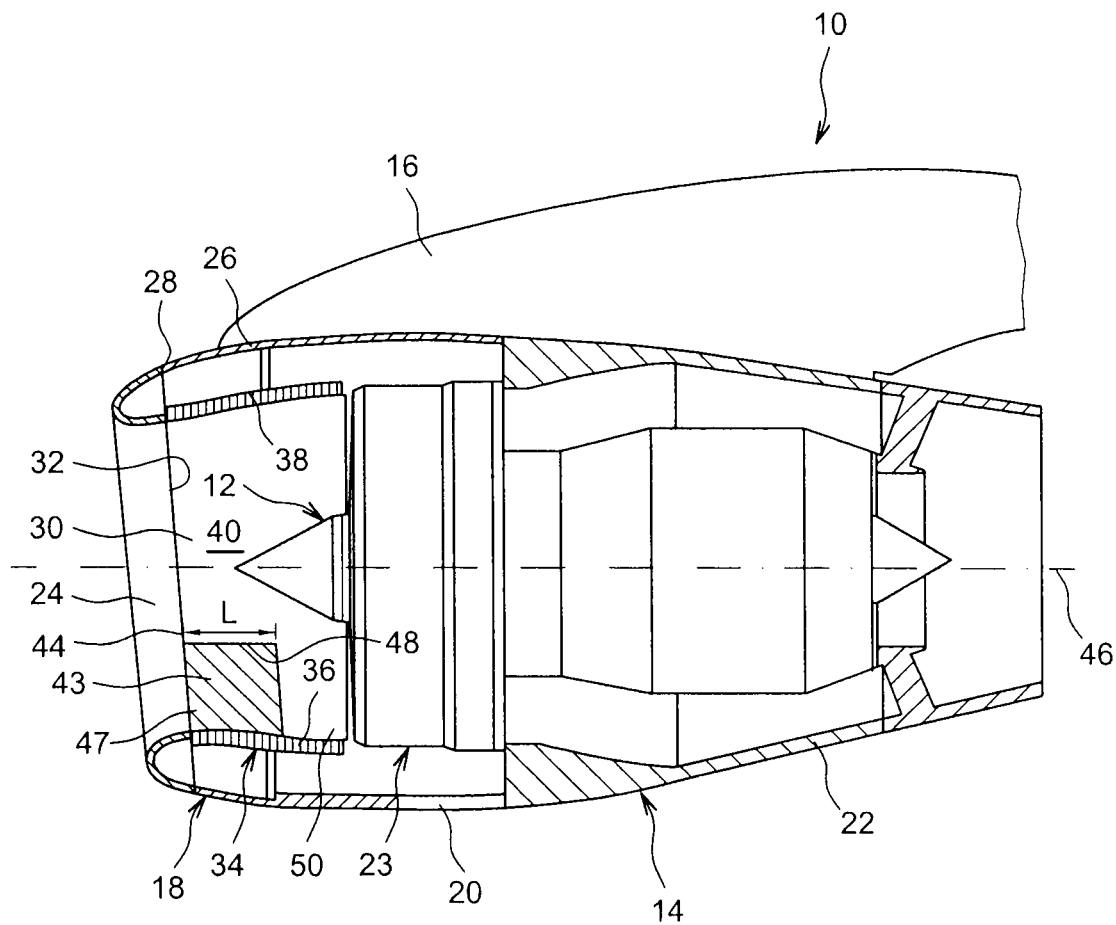
FIG. 1 is a partial, schematic, axial-section view of an aircraft propulsion unit according to a first embodiment of the invention.

FIG. 1 shows a propulsion unit 10 comprising a turbofan engine 12 housed in a nacelle 14 and joined to a pylon 16 intended to be fixed underneath the wing of an aircraft, not visible in the figure.

The nacelle 14, from upstream to downstream in the general direction of the flow of gases in the turbojet engine 12, comprises an air inlet 18, a median section 20 and a downstream section 22.

Figure 2:
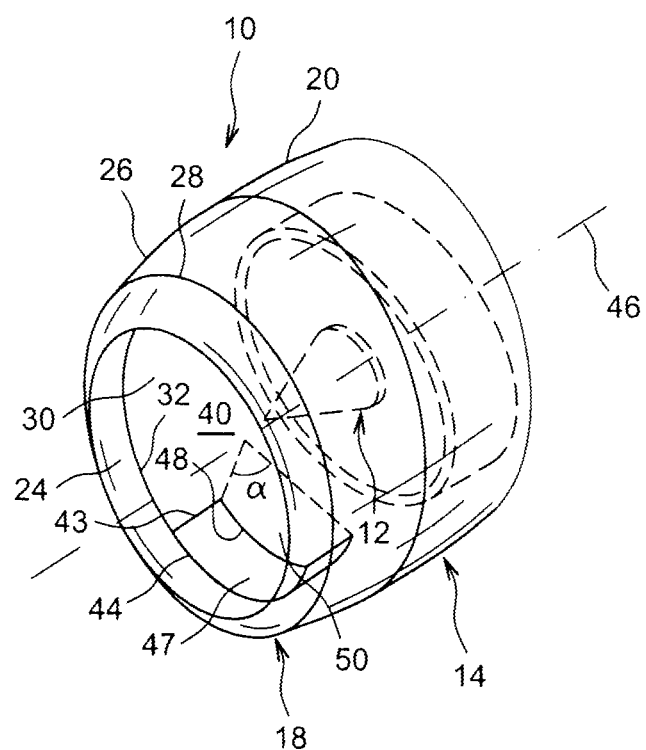
FIG. 2 is a partial, schematic, perspective view of an air inlet of the propulsion unit in FIG. 1.

The median section 20 of the nacelle 14 is of conventional type and is essentially in the form of an annular envelope arranged around a fan assembly 23 of the turbojet engine 12 as very schematically illustrated in FIGS. 1 and 2. This median section 20 is a part independent from the air inlet 18, but it could also be formed in a single piece with this air inlet 18.

The downstream section 22 of the nacelle 14 is also of conventional type and integrates thrust reversing means for example, which cannot be seen in FIG. 1.

The air inlet 18, which can also be seen in FIG. 2, comprises a substantially annular lip 24 forming the leading edge of the nacelle 14, substantially annular outer cowling 26 connected to an outer downstream edge 28 of the lip 24, and a substantially annular inner envelope 30 connected to an inner downstream edge 32 of the lip 24 and intended to channel the air feeding the turbojet engine 12.

The air inlet 18 particularly comprises a substantially annular inner structure 34 which, radially from the inside towards the outside, comprises the above-mentioned inner envelope 30, a sound-insulating honeycomb structure 36, and an impermeable inner skin 38.

In a manner known per se, the inner structure 34 is configured to attenuate the noise induced by the air flow in the air inlet 18 and by the rotation of the fan of the turbojet engine 12. For this purpose, the inner envelope 30 has a permeable structure allowing fluid communication between the channel 40 feeding the turbojet engine 12 and the alveoli 41 (FIG. 3) of the honeycomb structure 36.

Figure 3:
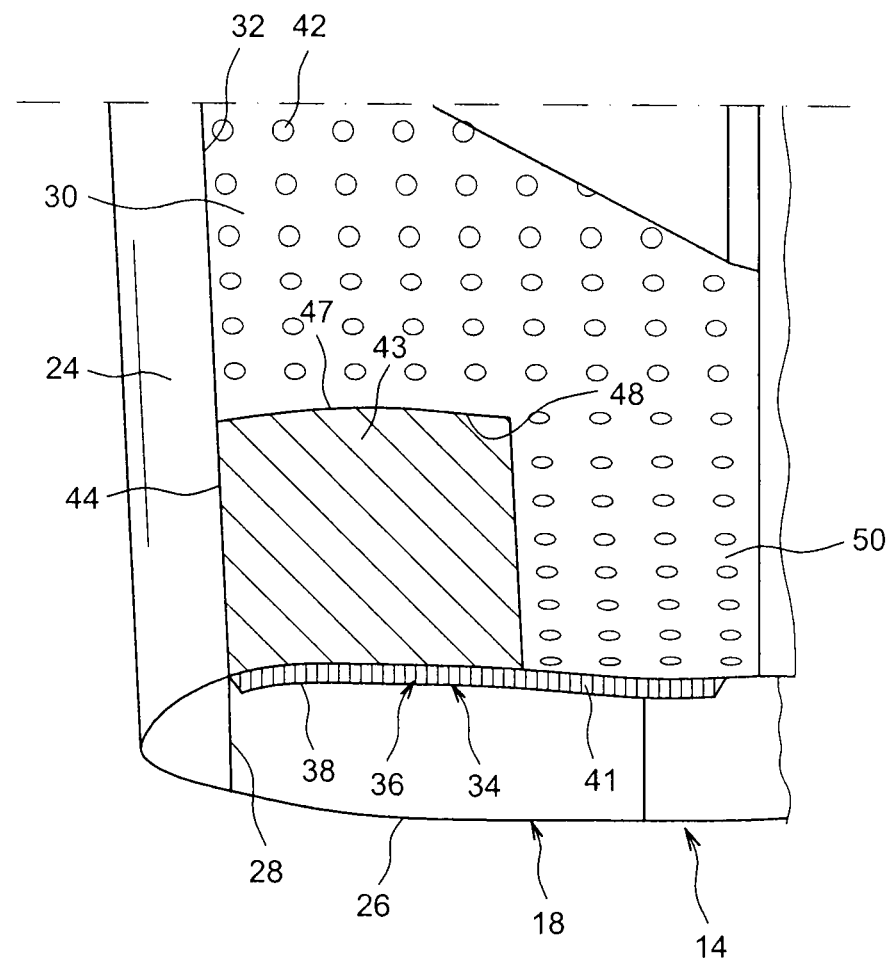
FIG. 3 is a partial, schematic, perspective view along an axial section of the air inlet in FIG. 2.

More precisely, the inner envelope 30 is made in a composite material for example, having openwork or orifices 42 allowing the passing of air, as shown in FIG. 3.

In a manner also known per se, the inner structure 34 is formed of a plurality of circumferentially adjacent panels each one forming a portion of the inner envelope 30, of the honeycomb structure 36 and of the inner skin 38. As a variant, the inner envelope 30, the honeycomb structure 36 and the inner skin 38 may each be formed of a single, substantially annular panel.

According to the invention, the inner envelope 30 of the air inlet 18 has a portion 43 devoid of air passage orifices. By air passage orifices is meant all types of orifices or openwork allowing air to pass, which means that the portion 43 is substantially impermeable to air.

The above-mentioned portion 43 is located in a lower part of the inner envelope 30 and extends axially over a distance L (FIG. 1), for example equal to about 60% of the mean axial span of the inner envelope 30, substantially from an upstream edge 44 of the inner envelope 30. This portion 43 extends circumferentially at an angle α, of about 90°, measured around a longitudinal axis 46 of the turbojet engine (FIG. 2), symmetrically relative to a vertical plane passing through the axis 46 and corresponding to the sectional plane in FIGS. 1 and 3.

More generally, in the present invention, the axial span L of the above-mentioned portion 43 is between 20% and 90% of the mean axial span of the inner envelope 30, and is preferably between 40% and % of this mean axial span. In addition, the circumferential span a of the above-mentioned portion 43 is between 60° and 150°, and is preferably between 90° and 120°.

The above-mentioned portion 43 may be of substantially rectangular shape as in FIGS. 1 to 3, or any other suitable shape.

In general, the portion 43 of the inner envelope 30 that is devoid of fluid passage orifices does not allow the passing of air and is therefore not subject to mechanical load resulting from the search for pressure equilibrium either side of this inner envelope 30.

It is to be noted that the portion 43 devoid of fluid passage orifices is defined in a region of the inner envelope 30 which is usually the region the most exposed to risks of overpressure phenomena which may occur, in particular during the aircraft's climbing phase.

In a first embodiment, illustrated in FIGS. 1 to 3, the portion 43 devoid of air passage orifices is formed of an impermeable panel 47, formed for example by the lay-up of three folds of carbon fibres, this impermeable panel 47 being set in a recess 48 of mating shape arranged in the upstream edge of at least one openwork panel 50 of the inner envelope 30.

When the inner envelope 30 is formed of several curved panels that are circumferentially adjacent, the above-mentioned recess 48 may be formed in the upstream edge of a single panel, or else it may be formed jointly in the upstream edge of several of these panels.

As can be seen in FIGS. 1 and 3, it is to be noted that the honeycomb structure 36 extends underneath the portion 43 of the inner envelope 30 which is devoid of air passage orifices. This is not essential for the invention but may contribute towards the rigidity of the inner structure 34 of the air inlet 18 and it may also facilitate the manufacture of this air inlet 18 by allowing the use of a sound-insulating structure of conventional type.

As a variant, the portion 43 of the inner envelope 30 that is devoid of air passage orifices can be made in a single piece with the remainder of this inner envelope 30. It is to be understood thereby that if the inner envelope 30 is formed of a single annular panel, the portion 43 is then delimited on the annular panel, while if the inner envelope 30 is formed of several adjacent curved panels, the portion 43 can be delimited jointly on one or more of these panels.

The invention according to the first embodiment described above particularly has the advantage that it can easily be implemented during maintenance or repair operations of an air inlet of conventional type, by cutting out the recess 48 in an inner envelope 30 of this air inlet then inserting an impermeable panel 47 in the recess 48. This latter operation may, for example, comprise the lay-up of three folds of carbon fibres inside the recess 48.

Figure 4:
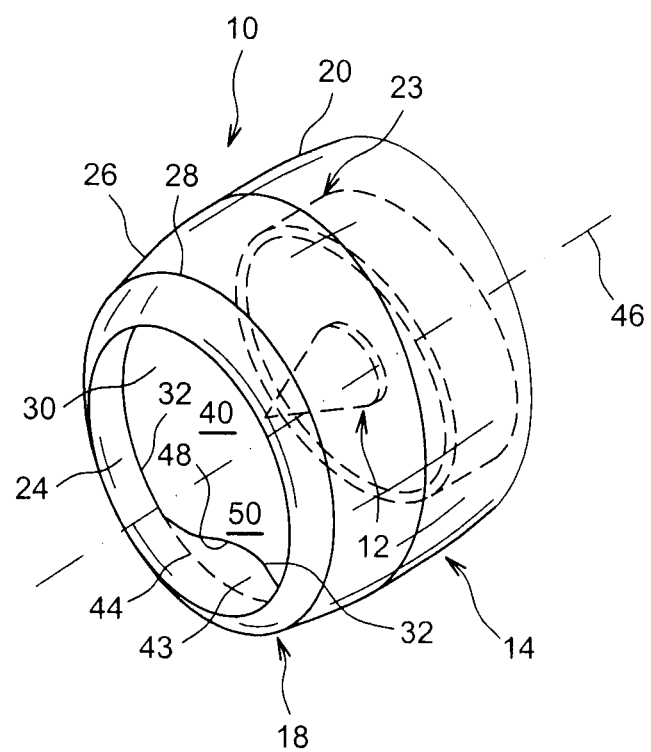
FIG. 4 is a partial, schematic view in perspective of an air inlet of an aircraft propulsion unit according to a second embodiment of the invention.

In a second embodiment of the invention illustrated FIG. 4, the portion 43 of the inner envelope 30 that is devoid of air passage orifices is made in a single piece with the lip 24 of the air inlet 18 and extends projecting backwardly from the radially inner downstream edge 32 of the lip 24 so that it fits into the above-described recess 48.

In the example illustrated FIG. 4, the above-mentioned portion 43 is bell-shaped whose top part 52 is oriented downstream, which means that the shape of the recess 48 in FIG. 4 differs from the shape of the recess 48 in FIGS. 1 to 3.

In this second embodiment, the continuity between the lip 24 and the portion 43 devoid of air passage orifices may permit a further increase in the resistance of the inner envelope 30 against the above-described overpressure phenomena.

The invention claimed is:

1. An air inlet for the nacelle of an aircraft propulsion unit comprising a substantially annular outer cowling, a substantially annular inner envelope intended to delimit a channel feeding air to a turbojet engine and comprising a plurality of fluid passage orifices passing through said envelope, and a substantially annular lip connected to respective upstream edges of said outer cowling and of said inner envelope so as to form a leading edge of said air inlet, wherein the inner envelope has a portion devoid of fluid passage orifices extending axially from an upstream edge of said inner envelope over a distance L of between 20% and 90% of the mean axial span of said inner envelope and having a circumferential span a of between 60° and 150° about a longitudinal axis of said air inlet.

2. The air inlet according to claim 1, wherein the portion of said inner envelope that is devoid of fluid passage orifices is located in a lower region of said inner envelope so that it is crossed by a plane which passes through the longitudinal axis of the air inlet and is parallel to the vertical direction when the air inlet equips a propulsion unit of an aircraft that is stationed on the ground.

3. The air inlet according to claim 1, wherein the plurality of fluid passage orifices comprises orifices for the passing of air communicating with a sound-insulating honeycomb structure housed between said inner envelope and said outer cowling.

4. The air inlet according to claim 3, wherein part of the sound-insulating honeycomb structure extends facing said portion devoid of fluid passage orifices of the inner envelope.

5. The air inlet according to claim 3,
comprising drainage means allowing circulation of water from upstream to downstream within a space defined between said outer cowling and said inner envelope of the air inlet, the drainage means comprising drainage orifices forming part of the plurality of fluid passage orifices.

6. The air inlet according to claim 5, wherein the drainage means comprise the sound-insulating honeycomb structure.

7. The air inlet according to claim 1 wherein said portion, of the inner envelope, devoid of fluid passage orifices assumes the form of an impermeable panel which is formed independently of the lip and is set in a recess of an upstream edge of at least one panel provided with fluid passage orifices and forming part of said inner envelope.

8. The air inlet according to claim 7, wherein the impermeable panel is formed of the lay-up of several folds of a composite material.

9. The air inlet according to claim 1 wherein said portion, of the inner envelope, devoid of fluid passage orifices is formed in a single piece with the lip and extends projecting backwardly from a radially inner downstream edge of the lip so that it fits into a recess of an upstream edge of at least one panel provided with fluid passage orifices and forming part of said inner envelope.

10. A nacelle for aircraft propulsion unit comprising an air inlet according to claim 1.

11. An aircraft comprising at least one nacelle according to claim 10.

12. A process for repairing a nacelle air inlet of an aircraft propulsion unit comprising a substantially annular outer cowling, a substantially annular inner envelope intended to delimit a duct feeding air to a turbojet engine of the propulsion unit and comprising a plurality of fluid passage orifices passing through said inner envelope, and a substantially annular lip connected to the respective upstream edges of said outer cowling and of said inner envelope so as to form a leading edge of said air inlet, the process comprising a step for cutting out a recess in an upstream edge of said inner envelope, and a subsequent step to arrange an impermeable panel inside said recess and to fix the panel onto the edge of said recess, so as to form an air inlet according to claim 7 or 8.

* * * * *